(12) United States Patent
Ishikawa

(10) Patent No.: US 6,477,184 B1
(45) Date of Patent: Nov. 5, 2002

(54) TIME-DIVISION MULTIPLEXING TRANSMISSION SYSTEM

(75) Inventor: Hajime Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/079,337

(22) Filed: May 14, 1998

(30) Foreign Application Priority Data

May 20, 1997 (JP) .............................. 9-129191

(51) Int. Cl.$^7$ .............................. H04J 3/06; H04J 3/04
(52) U.S. Cl. ....................................... 370/509; 370/535
(58) Field of Search ................................ 370/503, 506, 370/508, 509, 514, 520, 535, 536, 537, 539, 541, 542, 522, 442, 527, 529; 375/365, 366, 368

(56) References Cited

U.S. PATENT DOCUMENTS

| | | | | |
|---|---|---|---|---|
| 5,014,272 A | * | 5/1991 | Yoshida ...................... | 370/509 |
| 5,136,587 A | * | 8/1992 | Obana et al. ................ | 370/516 |
| 5,270,714 A | | 12/1993 | Tanaka et al. | |
| 5,461,622 A | * | 10/1995 | Bleickardt et al. .......... | 370/535 |
| 5,517,533 A | | 5/1996 | Szmauz et al. | |
| 5,710,774 A | * | 1/1998 | Suh et al. ................... | 370/513 |
| 5,857,092 A | * | 1/1999 | Wakamura et al. ......... | 395/500 |
| 5,887,039 A | * | 3/1999 | Suemura et al. ............ | 375/365 |
| 6,151,312 A | * | 11/2000 | Evans et al. ................ | 370/395 |

FOREIGN PATENT DOCUMENTS

| | | |
|---|---|---|
| JP | 60-39937 | 3/1985 |
| JP | 63-227196 | 9/1988 |
| JP | 1-233845 | 9/1989 |
| JP | 2-132934 | 5/1990 |
| JP | 2-253735 | 10/1990 |
| JP | 2-256336 | 10/1990 |
| JP | 3-447 | 1/1991 |
| JP | 4-21223 | 1/1992 |
| JP | 4-178036 | 6/1992 |
| JP | 4-48594 | 2/1993 |
| JP | 5-56016 | 3/1993 |
| JP | 5-68013 | 3/1993 |
| JP | 5-219000 | 8/1993 |
| JP | 5-235928 | 9/1993 |
| JP | 5-268581 | 10/1993 |
| JP | 5-284127 | 10/1993 |
| JP | 6-120925 | 4/1994 |
| JP | 7-15398 | 1/1995 |
| JP | 8-163069 | 6/1996 |

OTHER PUBLICATIONS

Proceedings of the Annual Conference of the Institute of Electronics, Information and Communciation Engineers, B–8–57 (Mar. 6, 1997), Tekuza Tetsuya, Multiplex Signal Separation Methods in GTTH.

The Institute of Electronics, Information and Communication Engineers Technical Research Report, SSE96–169 (Feb. 21, 1997), Tezuka, Tetsuya, Review of Multiplex Separation Methods in GTTH, p. 41–46.

Raj Jain, High–Speed Networking Using Fiber and Other Media, 1995, Addison–Wesley Publishing company, pp. 157–166.*

* cited by examiner

Primary Examiner—Chau Nguyen
Assistant Examiner—Andy Lee
(74) Attorney, Agent, or Firm—Scully, Scott, Murphy & Presser

(57) ABSTRACT

In a transmitter, at least some of synchronization patterns in a signal having frame structure are inverted in a bit inverting circuit, and a plurality of channels of signals which include a signal having the inverted synchronization patterns are multiplexed and transmitted in a time-division manner. In a receiver, the time-division multiplexed channels are demultiplexed into individual channels. Then, frame synchronization is performed on the basis of the channel having the inverted synchronization patterns among the demultiplexed channels. With the frame synchronized channel as a reference, the remaining channels are identified. There is no need to provide a synchronization circuit in each channel, and the size of the system is not increased.

16 Claims, 14 Drawing Sheets

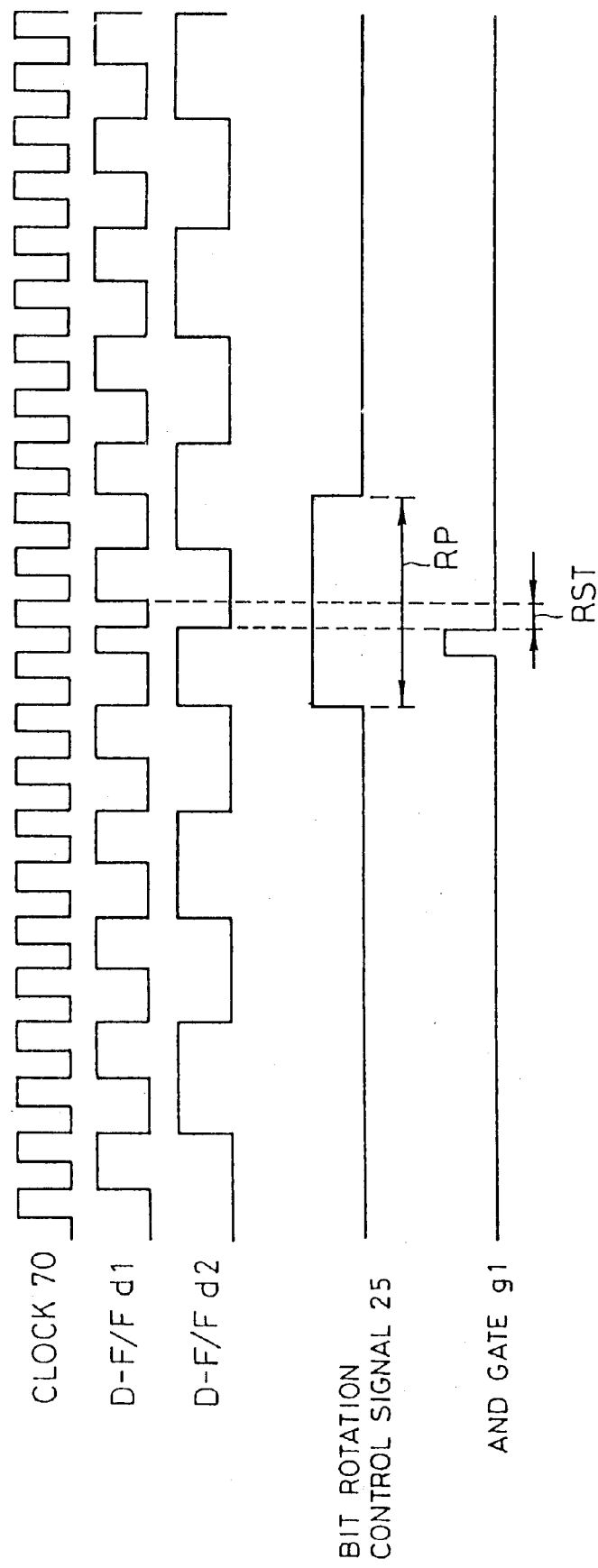

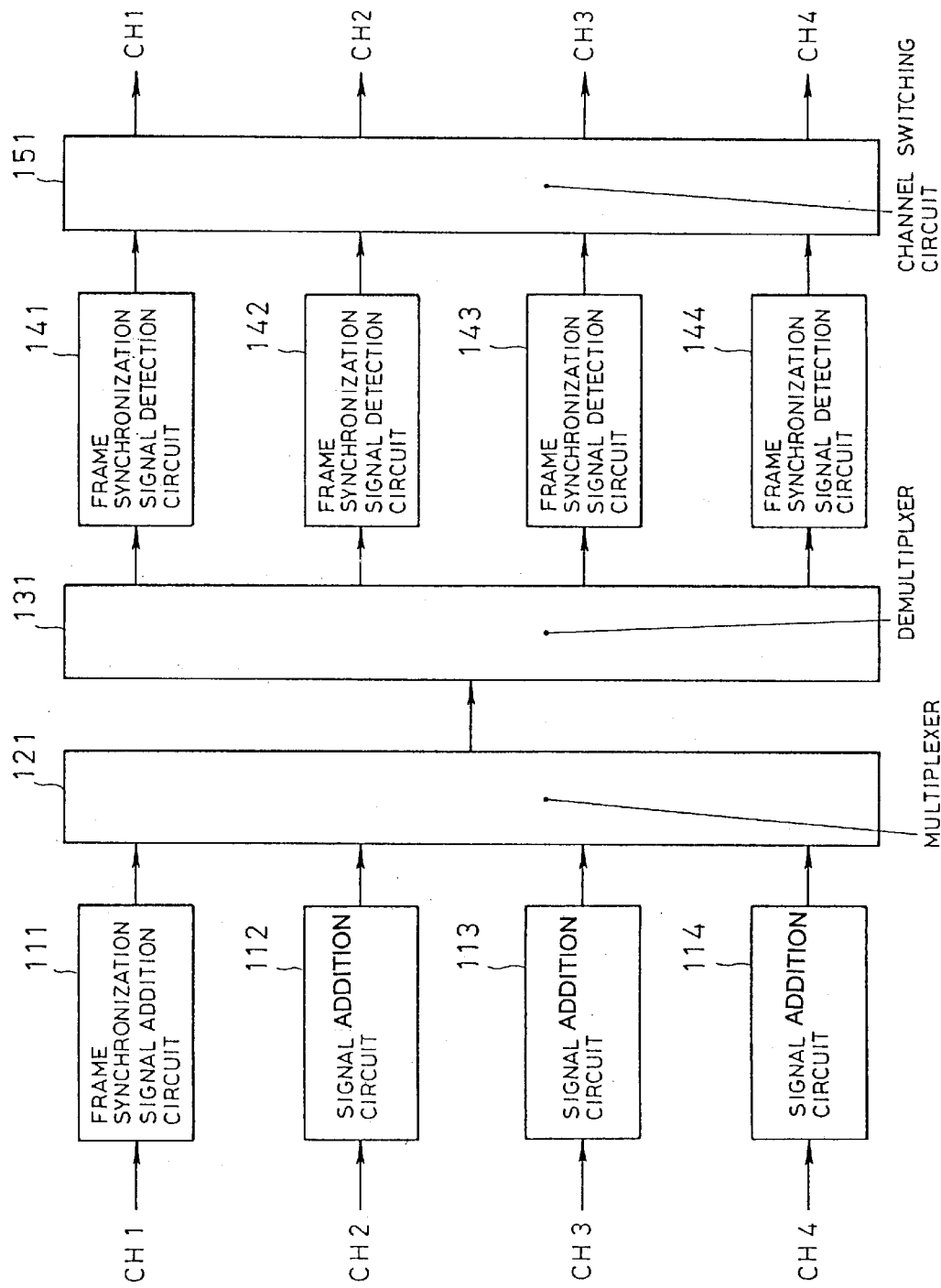

TIME-DIVISION MULTIPLEXING TRANSMISSION SYSTEM

BACKGROUND OF THE INVENTION

1. Field of the Invention

The present invention relates to a time-division multiplexing transmission system, and more particularly to a time-division multiplexing transmission system for performing channel identification in the case where each of a plurality of signals including at least one frame structure signal having frame structure is multiplexed as one channel and transmitted in a time-division manner.

2. Description of the Prior Art

A conventional time-division multiplexing transmission system is disclosed in Japanese Patent Application Laid-Open No. 2-253735. A description will be made of this conventional system in reference to FIG. 15.

In the figure, in the conventional system, a frame synchronization signal is first added to a specific channel signal by a frame synchronization signal addition circuit 111. Then, signal addition circuits 112 to 114 add signals differing from the frame synchronization signal to the other channels instead of adding respective frame synchronization signals. Next, these channel signals are multiplexed and transmitted on a transmission path by a multiplexer 121.

A demultiplexer 131 demultiplexes the output signal from the multiplexer into four individual channel signals. Frame synchronization is performed on the four channels by frame synchronization signal detection circuits 141 to 144. At this time, it can be judged that the channel in which frame synchronization has been established is the above-mentioned specific channel. A channel switching circuit 151 performs a switch of the channels on the basis of the outputs of the frame synchronization signal addition circuits 141 to 144.

In the above-mentioned conventional time-division multiplexing transmission system, at the transmitter side there is a need to add a new frame synchronization signal to a specific channel and add signals differing from the frame synchronization signal to the other channels. For this reason, the channels require signal addition circuits respectively, and consequently, there is a disadvantage that the entire size of the system is increased.

Also, this conventional transmission system has another disadvantage that it requires circuitry which operates at a higher transmission rate, because the above-mentioned signals are added.

BRIEF SUMMARY OF THE INVENTION

The prevent invention has been made in order to solve the above-mentioned disadvantages of the prior art, and the objective is to provide to a time-division multiplexing transmission system which is structurally simple and where there is no increase in the size.

To achieve this end, there is provided a time-division multiplexing transmission system for multiplexing and transmitting a plurality of channels of signals which include at least one frame structure signal having frame structure in a time-division manner, the time-division multiplexing transmission system comprising: a transmitter having inversion means for inverting at least some of synchronization patterns in the frame structure signal and time-division multiplexing means for multiplexing and transmitting a plurality of channels of signals which include a signal having the inverted synchronization patterns in a time-division manner; and a receiver having demultiplexing means for demultiplexing the time-division multiplexed channels into individual channels, also having frame synchronization means for performing frame synchronization on the basis of the channel having the inverted frame synchronization patterns among the demultiplexed channels, and further having channel identification means for using the frame synchronized channel as a reference and recognizing the remaining channels.

In the transmitter, at least some of synchronization patterns in a signal having frame structure are inverted, and a plurality of channels of signals which include a signal having the inverted synchronization patterns are multiplexed and transmitted in a time-division manner. In the receiver, the time-division multiplexed channels are demultiplexed into individual channels. Then, frame synchronization is performed on the basis of the channel having the inverted synchronization patterns among the demultiplexed channels. With the frame synchronized channel as a reference, the remaining channels are identified. With this constitution, the system becomes structurally simple and there is no possibility that the size of the system will be increased.

BRIEF DESCRIPTION OF THE DRAWINGS

The present invention will be described in further detail with reference to the accompanying drawings in which:

FIG. 7 is a timing chart showing the operation of the division circuit with a phase shift function of FIG. 6;

FIG. 15 is a block diagram showing the constitution of a conventional time-division multiplexing transmission system.

DETAILED DESCRIPTION OF THE PREFERRED EMBODIMENTS

A preferred embodiment of the present invention will hereinafter be described in reference to the drawings.

Figure 1:
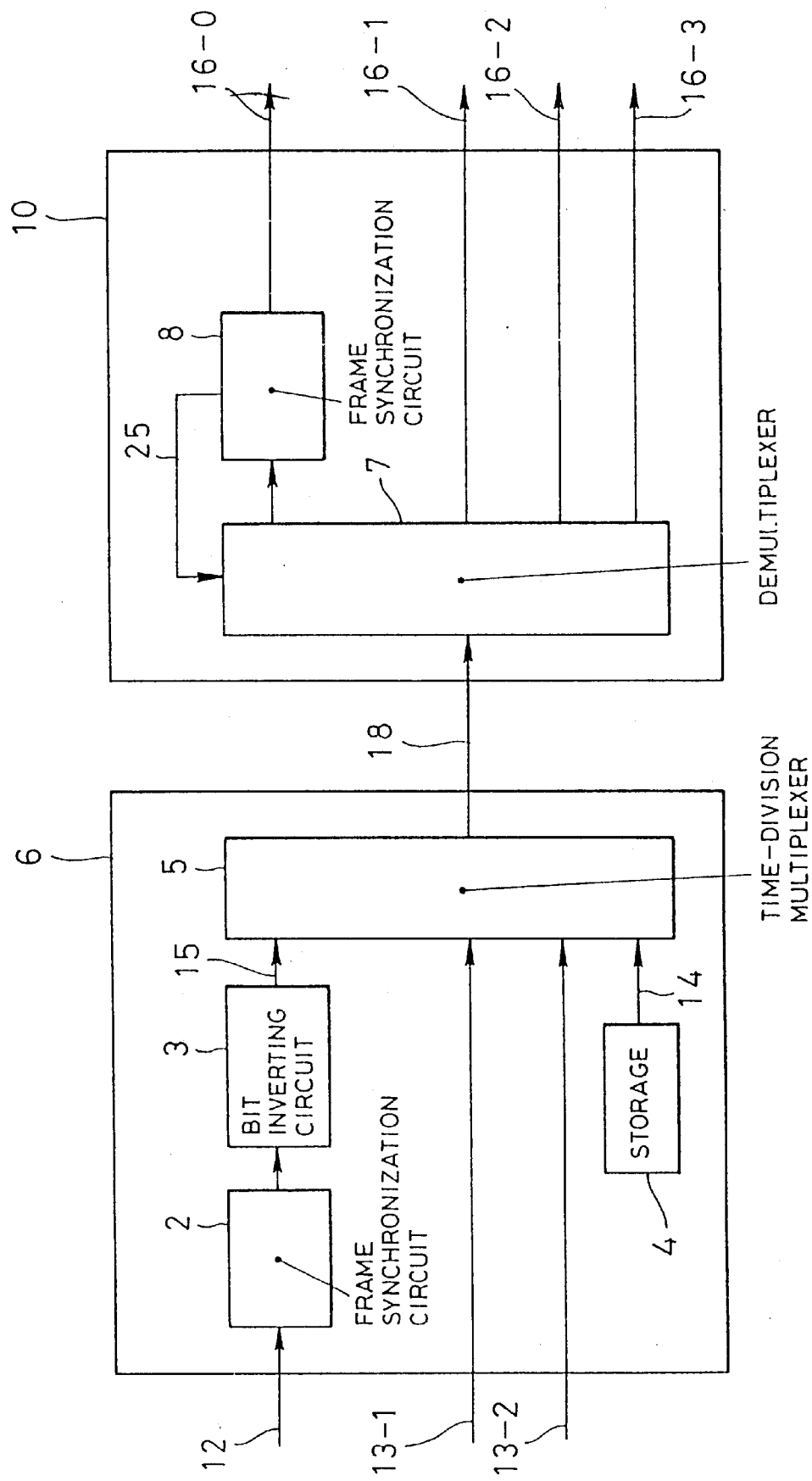
FIG. 1 is a block diagram showing the constitution of a time-division multiplexing transmission system according to an embodiment of the present invention.

FIG. 1 shows an embodiment of a time-division multiplexing transmission system employing a channel identification method according to the present invention. As shown in the figure, the system according to the present invention is constituted by a transmitter 6 which receives a signal 12 and outputs a signal 18 after time-division multiplexing and a receiver 10 which receives the signal 18 from the transmitter 6 and outputs channels to the output ports 16-0 to 16-3.

The transmitter 6 is constituted by a frame synchronization circuit 2 which performs frame synchronization by detecting a synchronization pattern from the signal 12 having frame structure, a bit inverting circuit 3 which inverts some or all of the synchronization pattern in the signal on the basis of a flag indicating the temporal position of a frame synchronization byte, a storage 4 which outputs a free-format signal 14, and a time-division multiplexer 5 which multiplexes channel 0 (reference signal) of the bit-inverted signal 15 and other channels in a time-division manner.

The receiver 10 is constituted by a demultiplexer 7 which demultiplexes the time-division multiplexed signal 18 into individual channels and a frame synchronization circuit 8 which performs frame synchronization on the signal 15 within the transmitter 6 by monitoring all the individual channels and then detecting the bit inverted synchronization pattern.

In such constitution, the signal 12 with frame structure, fetched from a network, is input to the frame synchronization circuit 2 of the transmitter 6. his frame synchronization circuit 2 performs frame synchronization by detecting the synchronization pattern.

The frame synchronization circuit 2 outputs the signal 12 having frame structure and also outputs a flag indicating the temporal position of a synchronization byte in the signal. The bit inverting circuit 3 inverts some or all of synchronization patterns in the signal, based on the flag indicating the temporal position of a synchronization byte. In this case the position at which a bit is inverted has previously been determined.

Figure 2:
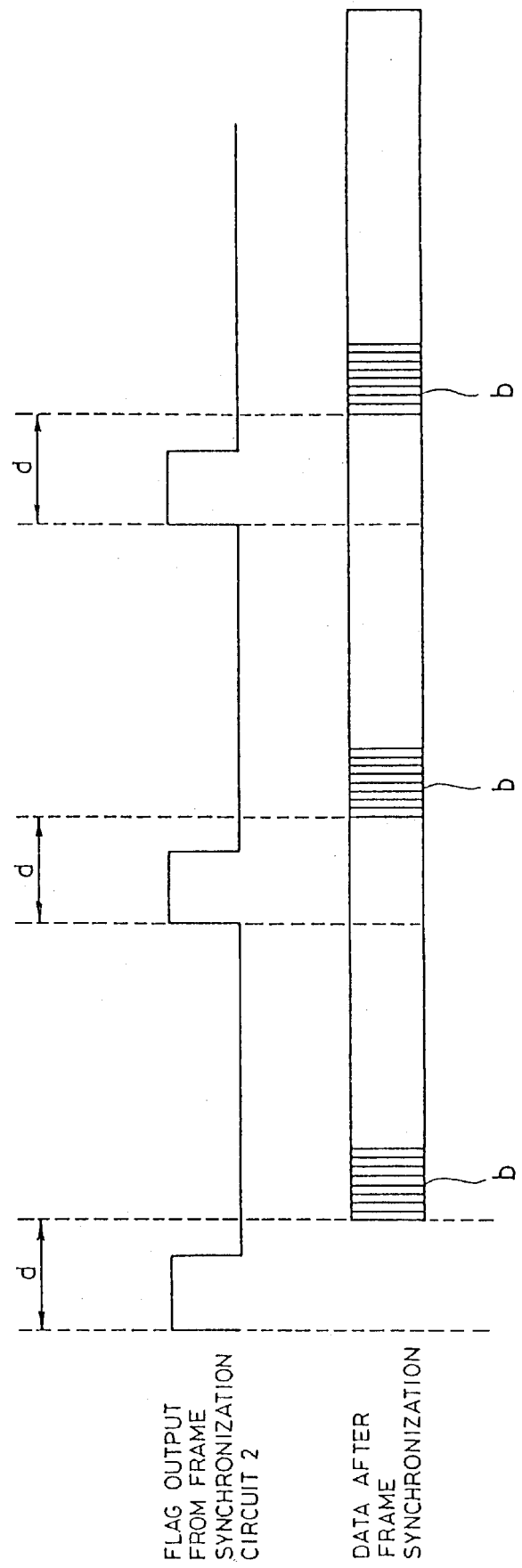
FIG. 2 is a timing chart showing the operation of the time-division multiplexing transmission system in FIG. 1.

That is, as shown in FIG. 2, the flag and frame synchronization byte b which are output from the frame synchronization circuit 2 are output at intervals of a constant time d. The bit inverting circuit 3 inverts a byte after time d from the rising edge of the flag. A specific description as to which byte is inverted will be described later.

The output signal 15 of the bit inverting circuit 3 which has bit-inverted frame structure is used as channel 0 (reference channel), and channel 0 and other channels are multiplexed in a time-division manner by the time-division multiplexer 5. After this time-division multiplexing, the output signal 18 is transmitted from the transmitter 6 to the receiver 10.

In this embodiment, the contents of channel 1 and channel 2 are signals 13-1 and 13-2 with frame structure, fetched from a network. The content of channel 3 is a free-format signal 14 which is output from the storage 4. The free format means that signal format does not matter with respect to a certain signal.

Assume that the content of each channel other than channel 0 may be a signal with frame structure as in the signals 13-1 and 13-2 or may be a signal with entirely original format like a free-format signal 14. The frame structure of the signal 12 and the frame structures of the signals 13-1 and 13-2 may be the same kind or different kinds.

The same kind of frame means a frame having the same frame synchronization byte and having the same frame length. Therefore, a frame synchronization circuit is common to frames of the same kind, and frames of the same kind cannot be discriminated from each other by frame synchronization alone.

On the other hand, a different kind of frame means a frame having a different frame synchronization byte or a different frame length. Therefore, frames of different kinds can be discriminated each other if only frame synchronization is performed.

Figure 3:
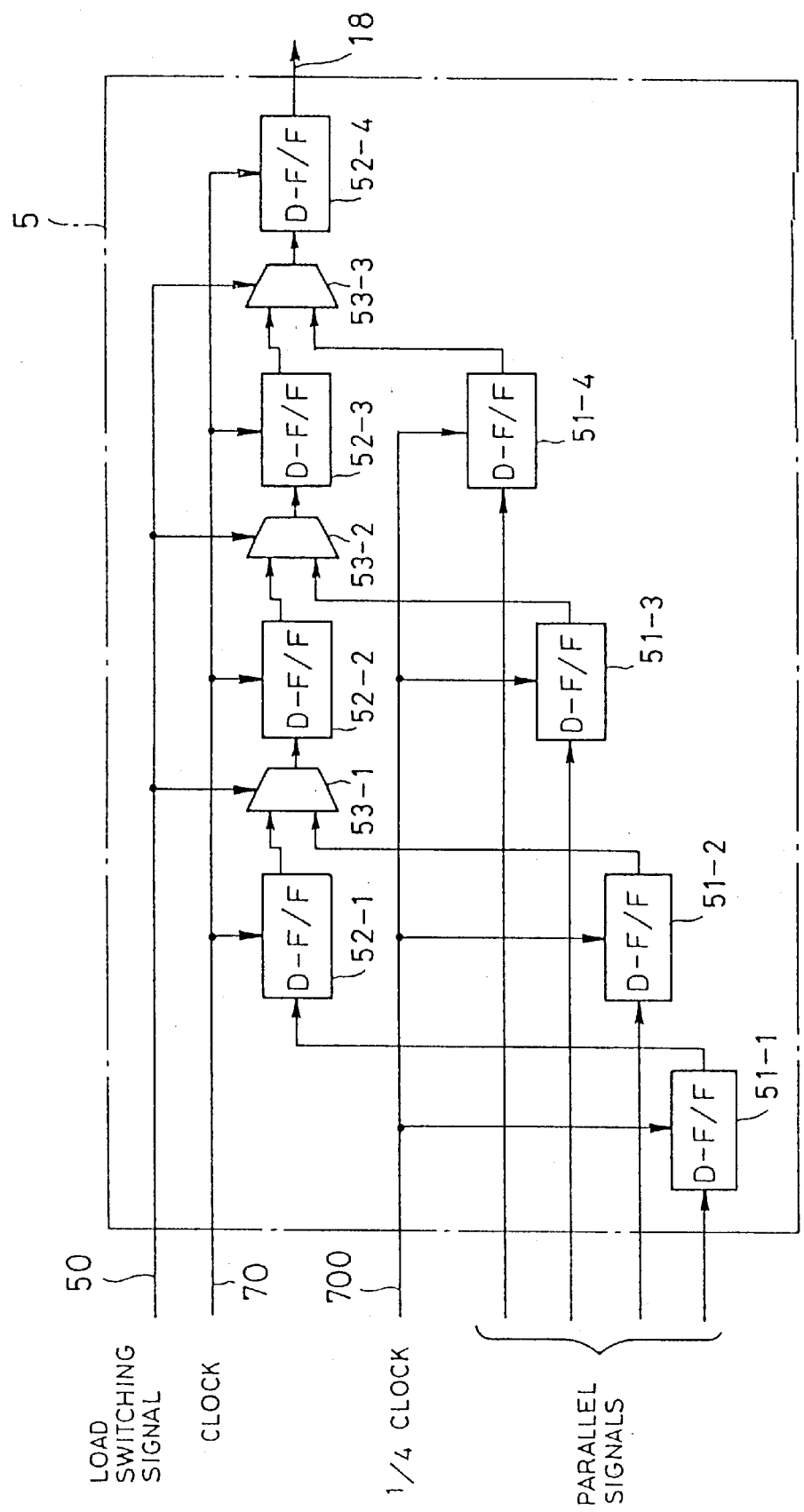
FIG. 3 is a block diagram showing the interior constitution of the time-division multiplexing transmission system in FIG. 1.

As shown in FIG. 3, the time-division multiplexer 5 within the transmitter 6 comprises D flip-flops 51-1 to 51-4 (hereinafter referred to as D-F/Fs) provided in correspondence to each signal constituting the parallel signals and to which parallel signals are input, a D-F/F 52-1 to which the output signal of the D-F/F 51-1 is input, a load change-over switch 53-1 which selectively outputs the output signal of the D-F/F 52-1 and the output signal of the D-F/F 51-2, and a D-F/F 52-2 to which the output signal of the switch 53-1 is input. A ¼ clock signal 700 is input to each of the D-F/Fs 51-1 to 51-4.

As shown in the figure, the time-division multiplexer 5 is constituted by a load change-over switch 53-2 which selectively outputs the output signal of the D-F/F 52-2 and the output signal of the D-F/F 51-3, and a D-F/F 52-3 to which the output signal of the switch 53-2 is input, a load change-over switch 53-3 which selectively outputs the output signal of the D-F/F 52-3 and the output signal of the D-F/F 51-4, and a D-F/F 52-4 to which the output signal of the switch 53-3 is input. A load change-over signal (load switching signal) 50 is input to the load change-over switches 53-1 to 53-3, and a clock signal 70 is input to the D-F/Fs 52-1 to 52-4.

In such constitution, parallel signals are input to the D-F/Fs 51-1 to 51-4 when a rising edge occurs on the ¼ clock signal 700. The output signals of the D-F/Fs 51-1 to 51-4 are input to the D-F/Fs 52-1 to 52-4 when a rising edge occurs on the clock signal 70. At this time, if the level of the load change-over signal 50 changes, the output levels of the load change-over switches 53-1 to 53-3 will change. For this reason, the signal 18 which is finally output becomes a signal in which four channels are multiplexed in a time-division manner.

Next, the receiver 10 receives the output signal 18 of the transmitter 6. The demultiplexer 7 demultiplexes the output signal 18 into individual channels. The frame synchronization circuit 8 monitors all the individual channels and detects a bit-inverted synchronization pattern, whereby frame synchronization is performed on the signal 15 having bit-inverted frame structure.

A method of monitoring all channels is as follows: Channels are monitored in order in a time-division manner with a single frame synchronization circuit. In this case the demultiplexer 7 is provided with a bit rotating function. When a serial signal is demultiplexed into parallel signals, the bit rotating function changes the phases of the parallel signals, thereby rotating the ports from which the parallel signals are output. In this embodiment, when frame synchronization is not obtained for a fixed time by the frame synchronization circuit 8, bit rotation is performed once at a time.

Figure 4:
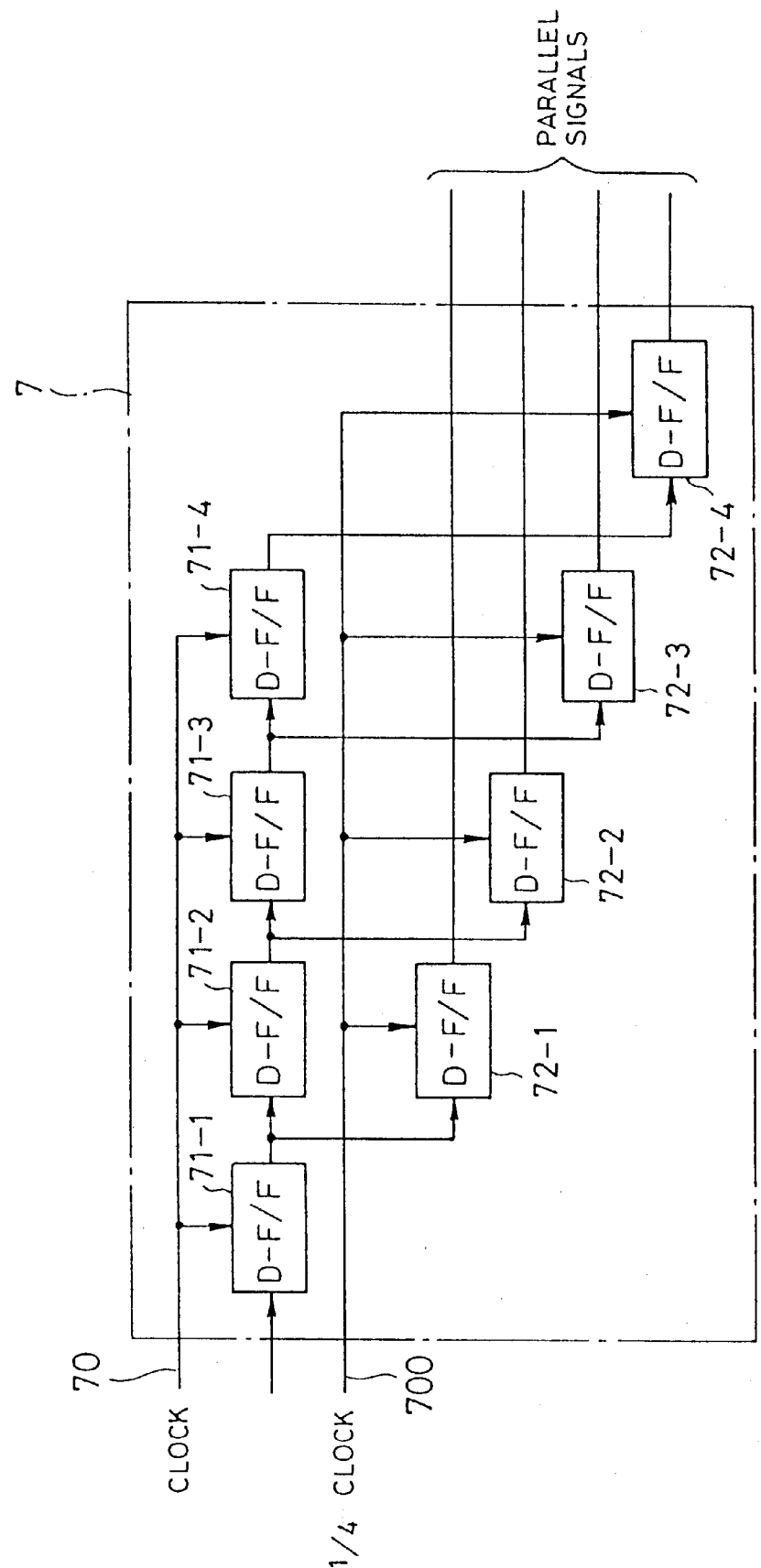
FIG. 4 is a block diagram showing the interior constitution of the demultiplexer in FIG. 1.

Now, a description will be made of the interior constitution example of the demultiplexer 7 having a bit rotating function in reference to FIG. 4. As shown in the figure, the demultiplexer 7 is constituted by four serial D-F/Fs 71-1 to 71-4 which operate in synchronization with the clock signal 70 and four D-F/Fs 72-1 to 72-4 to which the output signals of the D-F/Fs 71-1 to 71-4 are input and which operate in synchronization with the ¼ clock signal 700 which divides the clock signal 70 by ¼.

The operation of the demultiplexer 7 having such constitution will be described in reference to FIG. 5. In addition to the output states of the D-F/Fs 71-1 to 71-4 of FIG. 4, FIG. 5 shows the ¼ clock signal 700, the output states (1) of the D-F/Fs 71-1 to 71-4 before bit rotation, and the output states (2) of the D-F/Fs 71 to 71-4 after bit rotation.

Figure 5:
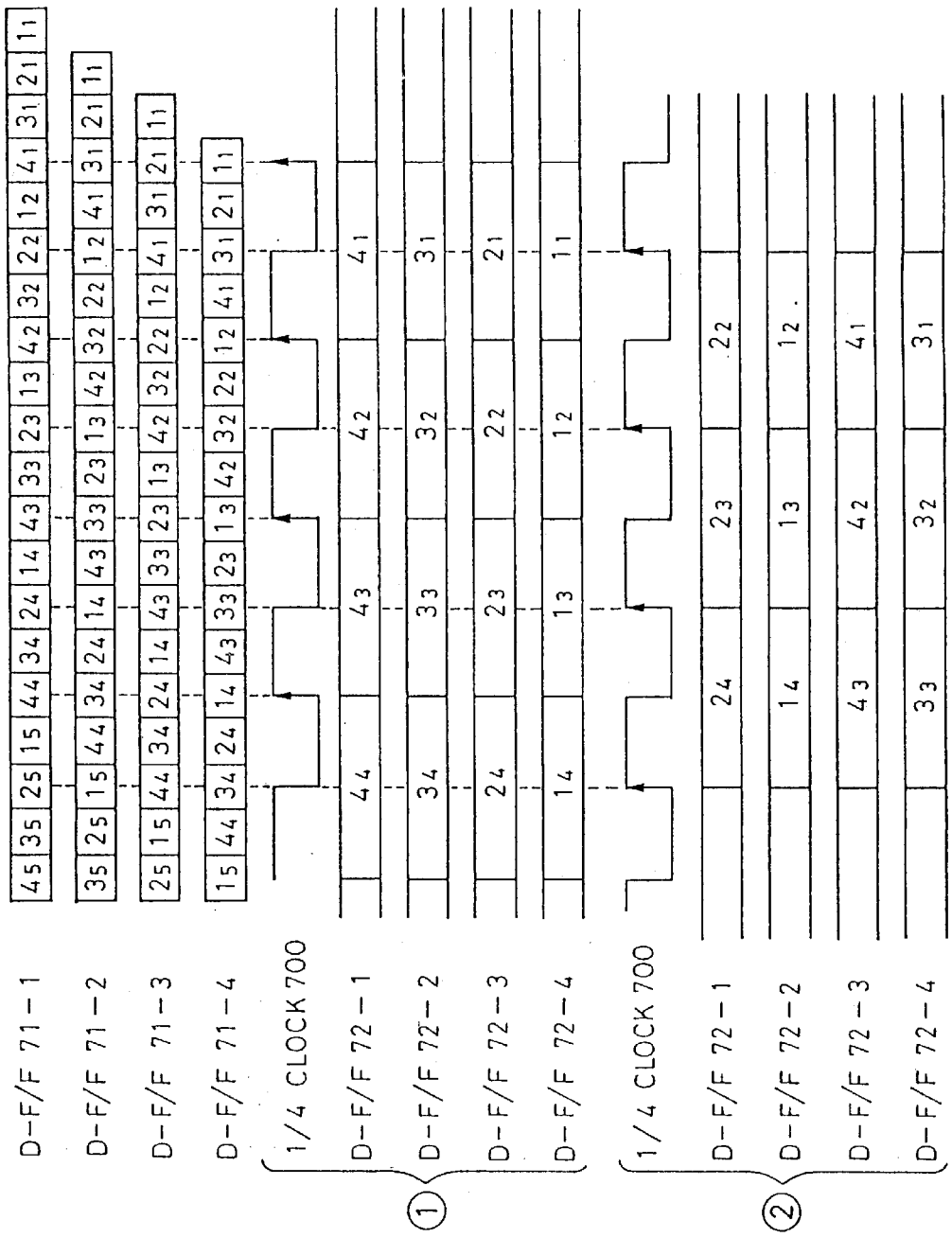
FIG. 5 is a timing chart showing the operation of the demultiplexer in FIG. 4.

In FIG. 5, four channels of data have been input to the D-F/Fs 71-1 to 71-4. The four channels of data are 11, 12, 13, 14, 15 . . . , 21, 22, 23, 24, 25 . . . , 31, 32, 33, 34, 35 . . . , and 41, 42, 43, 44, 45 . . . . Since these channels of data are input to the receiver 10 after they have been multiplexed in a time-division manner, the D-F/Fs 71-1 to 71-4 output 11, 21, 31, 41, 12, 22, 32, 42, 13, 23, 33, 43, 14, 24, 34, 44, 15, 25, 35, 45 . . . in the recited order.

In the state (1) before bit rotation, the output signals of the D-F/Fs 71-1 to 71-4 are input in sequence to the D-F/Fs 72-1 to 72-4 when a rising edge occurs on the ¼ clock signal 700. For this reason, the D-F/F 72-1 outputs 41, 42, 43, 44 . . . . The D-F/F 72-2 outputs 31, 32, 33, 34 . . . . The D-F/F 72-3 outputs 21, 22, 23, 24 . . . . The D-F/F 72-4 outputs 11, 12, 13, 14 . . . .

On the other hand, the case where bit rotation is performed by two bits by changing the phase of the ¼ clock signal 700 is the state (2) after bit rotation. Even in the state (2), the output signals of the D-F/Fs 71-1 to 71-4 are input in sequence to the D-F/Fs 72-1 to 72-4 when a rising edge occurs on the ¼ clock signal 700. For this reason, the D-F/F 72-1 outputs 21, 22, 23, 24 . . . . The D-F/F 72-2 outputs 11, 12, 13, 14 . . . . The D-F/F 72-3 outputs 41, 42, 43, 44 .... The D-F/F 72-4 outputs 31, 32, 33, 34 ....

Thus, if the phase of the ¼ clock signal 700 is changed, the ports which are output as parallel signals can be rotated when the serial signal input to the D-F/Fs 71-1 to 71-4 are demultiplexed into parallel signals by inputting the serial signal to the D-F/Fs 72-1 to 72-4. In other words, the function of changing data which is output from the demultiplexer 7, i.e., bit rotating function can be realized.

Figure 6:
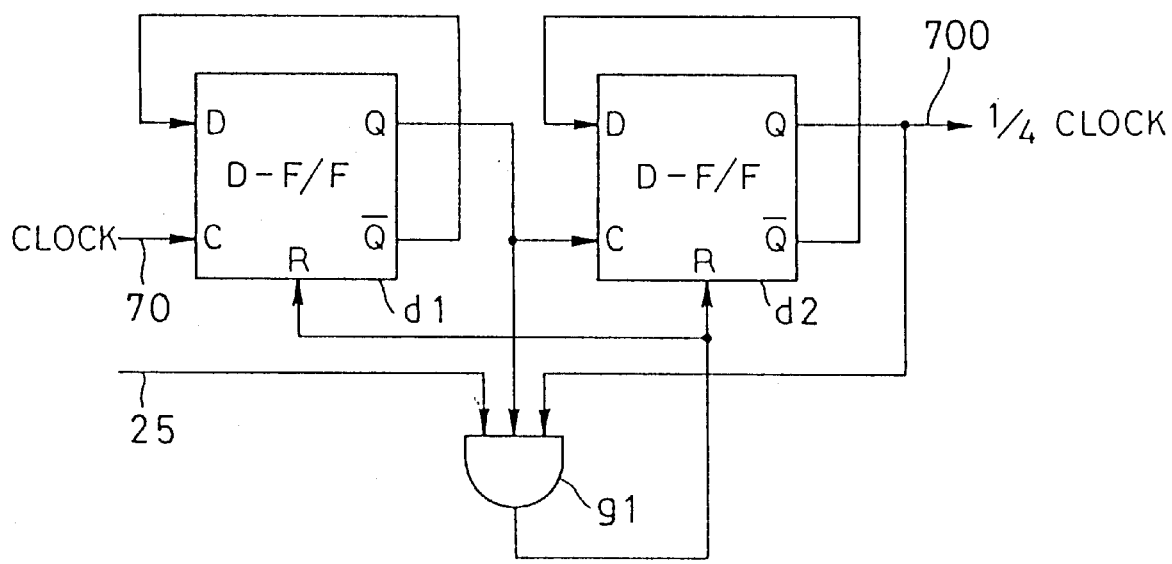
FIG. 6 is a circuit diagram showing the constitution of a division circuit with a phase shift function for producing a ¼ clock signal in the demultiplexer of FIG. 4.

The constitution example of a division circuit having a phase shift function for realizing such bit rotating function is shown in FIG. 6. In the figure, the phase shift circuit is constituted by two D-F/Fs d1 and d2 and an AND gate g1 to which the Q outputs of the D-F/Fs d1 and d2 and a bit rotation control signal 25 are input.

In such constitution, the two D-F/Fs d1 and d2 serve as known T flip-flops, because the inverted Q output is connected to the D input. Also, the output of the AND gate g1 is connected to the R (reset) inputs of the D-F/Fs d1 and d2. For this reason, when the levels on the Q outputs of both D-F/Fs d1 and d2 are "H (high)" and also the bit rotation control signal 25 is "H," the D-F/Fs d1 and d2 are both reset.

Therefore, as shown in a timing chart of FIG. 7, the D-F/F d1 outputs a clock signal which divides the clock signal 70 by 2, and the D-F/F d2 outputs a clock signal (above-mentioned ¼ clock signal 700) which further divides the clock signal of the D-F/F d1 by 2. When the D-F/Fs d1 and d2 are both "H" and also the bit rotation control signal 25 is "H" (during a period RP in FIG. 7), the output level of the AND gate g1 goes "H". At this time, during a period RST, the D-F/F d1 and D-F/F d2 are both reset by the output of the AND gate g1. This resetting causes the phase of the ¼ clock signal 700 to be shifted by one time slot (one cycle) of the clock signal 70.

The width of the time (RP) that the bit rotation control signal 25 is "H" is equal to one time slot (one cycle) of the ¼ clock signal 700. Therefore, during the period RP, both outputs of the D-F/F d1 and D-F/F d2 go "H" once, and at the same time, the output of the AND gate g1 also goes "H". As a consequence, if the bit rotation control signal 25 goes "H" once, the phase of the ¼ clock signal 700 will be shifted by one time slot (one cycle) of the clock signal 70. Therefore, the change quantity of the phase of the ¼ clock signal 700 can be adjusted by the frequency that the bit rotation control signal 25 goes "H". Note that the bit rotation control signal 25 which is input to the demultiplexer 7 is output from the frame synchronization circuit 8.

Returning to FIG. 1, in the case where the frame synchronization circuit 8 detects a channel where synchronization has been established, the channel is judged to be channel 0 (reference channel). Based on this, the channel at the next time slot of the channel 0 is identified to be channel 1. Similarly, the channel at the next time slot of the channel 1 is identified to be channel 2. The channels are output to the output ports 16-0 to 16-3.

While a description has been made of the case where the number of channels is 4 in total, it is obvious that the number of channels is not limited to 4. The typical example of the signal 12 having frame structure is a synchronization digital hierarchy (SDH) signal, and the synchronization patterns are called an A1 byte and an A2 byte by a standard.

Figure 8A:
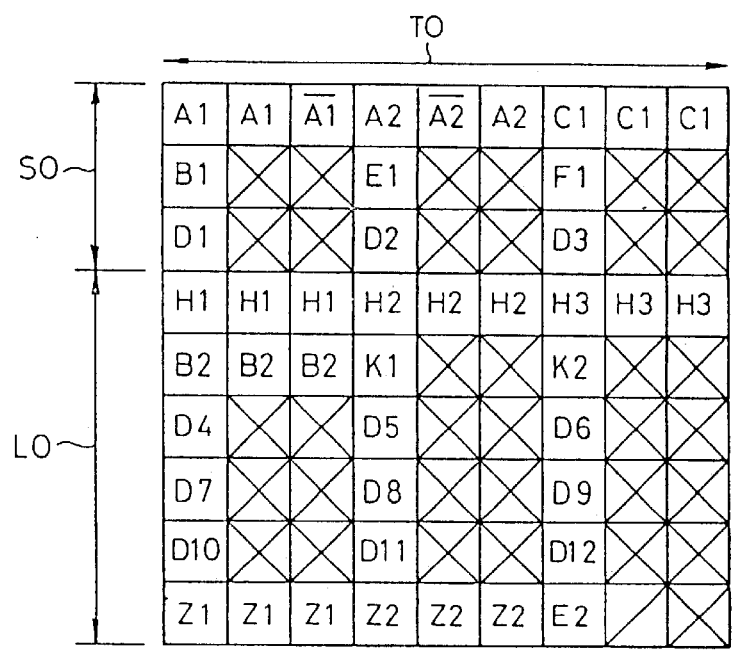
FIG. 8A and FIG. 8B are diagrams showing the frame format of an SDH signal.

FIG. 8 shows the OC-3 frame format of the SDH signal. As shown in FIG. 8A, a 9-column transport overhead (TO) is constituted by a section overhead (SO) and a line overhead (LO). The SO is provided with A1 bytes and A2 bytes which are synchronization patterns.

Figure 8B:
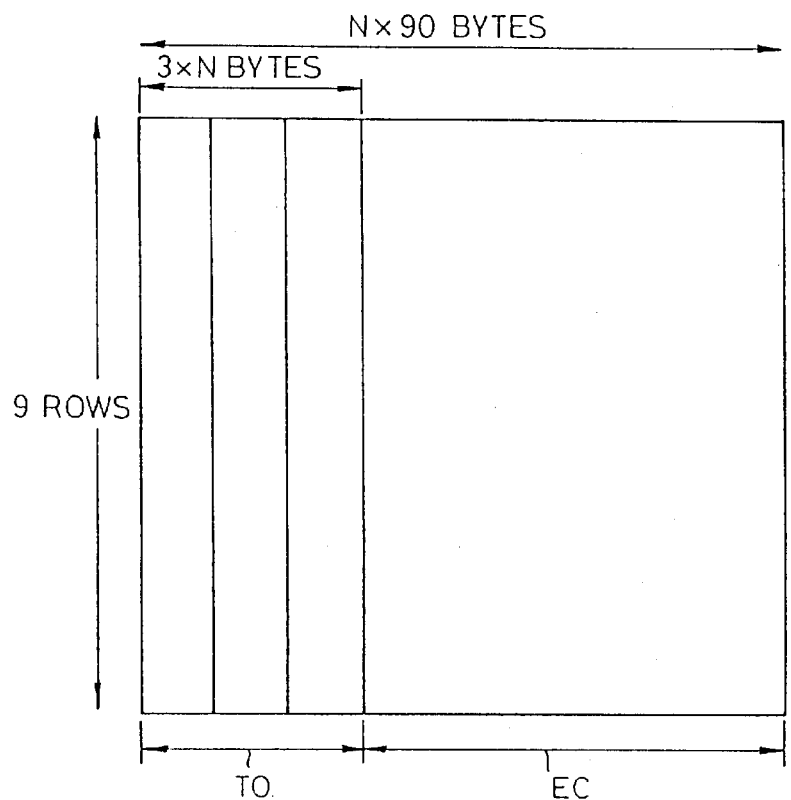

As shown in FIG. 8B, the TO is constituted by 9 rows of 3×N bytes and is added before an envelope capacity (EC). The entire frame format consists of N×90 bytes.

Referring to FIG. 8A, "A1" and "A2" are synchronization patterns. In this embodiment, only A1 and A2 having a bar (overbarred A1 and A2) are inverted, while A1 and A2 having no bar are not inverted. To perform synchronization, however, all of three A1 bytes and three A2 bytes may be inverted.

That is, some or all of A1 and A2 bytes may be inverted. To make a long story short, if at least some of A1 and A2 bytes are inverted, synchronization can be performed by detecting the inverted bytes. The present invention is not only applicable to the SDH signal but it may also be applied to a synchronization optical network (SONET) signal.

Figure 9:
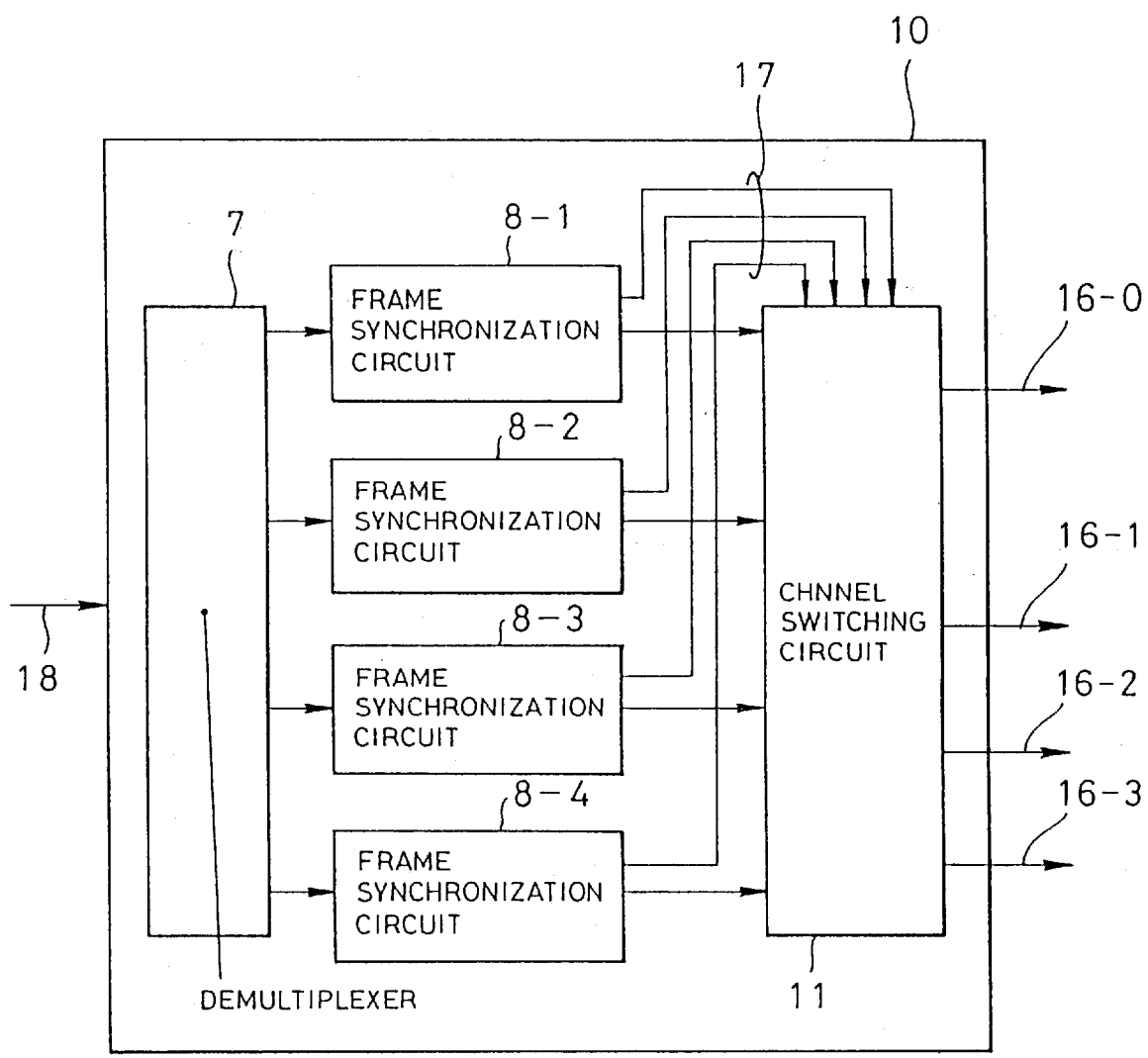
FIG. 9 is a block diagram showing another embodiment of the receiver in the time-division multiplexing transmission system of the present invention.

FIG. 9 shows another constitution example of the receiver 10 in the time-division multiplexing transmission system of the present invention. As shown in the figure, in the receiver of this embodiment, the demultiplexer 7 does not have a bit rotating function, but frame synchronization circuits 8-1 to 8-4 are provided in correspondence with the outputs of the demultiplexer 7 so that frame synchronization can be performed on all outputs at the same time. If frame synchronization is established in one of the frame synchronization circuits 8-1 to 8-4, the synchronization circuit will send a frame synchronization establishment signal 17 which indicated frame synchronization state.

A channel switching circuit 11 judges that channel 0 (reference channel) has been input to the frame synchronization circuit which produced the frame synchronization establishment signal 17. Based on this, the remaining channels are identified. The identified channels are sent to predetermined output ports 16-0 to 16-3 by a channel switching circuit 11.

Figure 10:
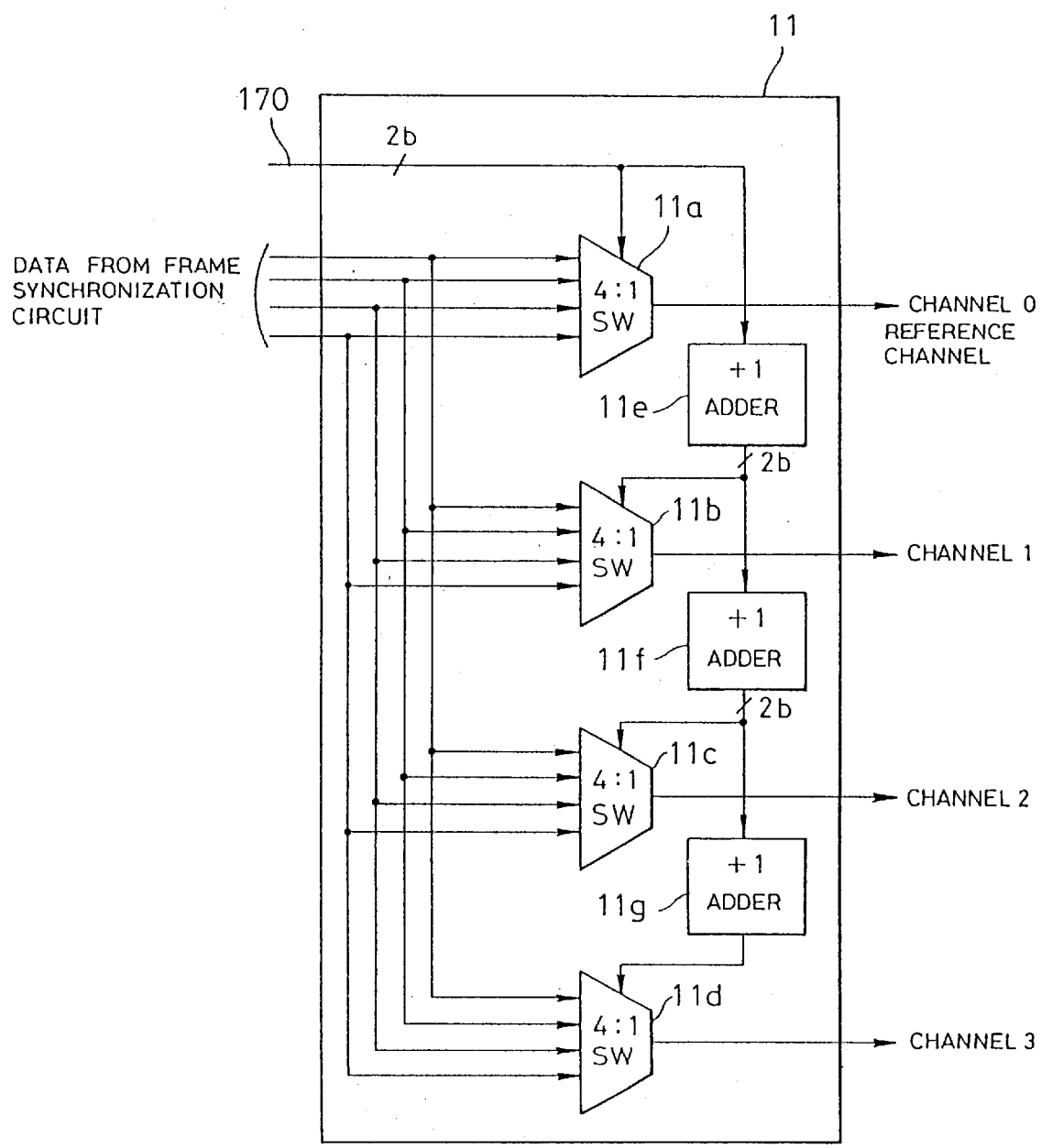
FIG. 10 is a block diagram showing the interior constitution of the channel switching circuit in FIG. 9.

The channel switching circuit 11, as shown in FIG. 10, is constituted by a first adder 11e which adds "1" to the value of a channel switching control signal 170, a second adder 11f which adds "1" to the output value of the first adder 11e, and a third adder 11g which adds "1" to the output value of the second adder 11f. Assume that in these adders, in the case where the sum is "4," "0" is output.

The channel switching circuit 11 is further constituted by a first 4:1 switch 11a which selectively sends the output signals of the frame synchronization circuits 8-1 to 8-4 in correspondence with the value of the channel switching control signal 170, a second 4:1 switch 11b which selectively sends the output signals of the frame synchronization circuits 8-1 to 8-4 in correspondence with the output value of the first adder 11e, a third 4:1 switch 11c which selectively sends the output signals of the frame synchronization circuits 8-1 to 8-4 in correspondence with the output value of the second adder 11f, and a fourth 4:1 switch 11d which selectively sends the output signals of the frame synchronization circuits 8-1 to 8-4 in correspondence with the output value of the third adder 11g.

Assume that the channel switching control signal 170 is a 2-bit signal indicating which of the channels from the frame synchronization circuit is reference channel 0. Therefore, this channel switching control signal 170 indicates that the frame synchronization has been established by the reference channel, among the channels from the frame synchronization circuit.

Figure 11:
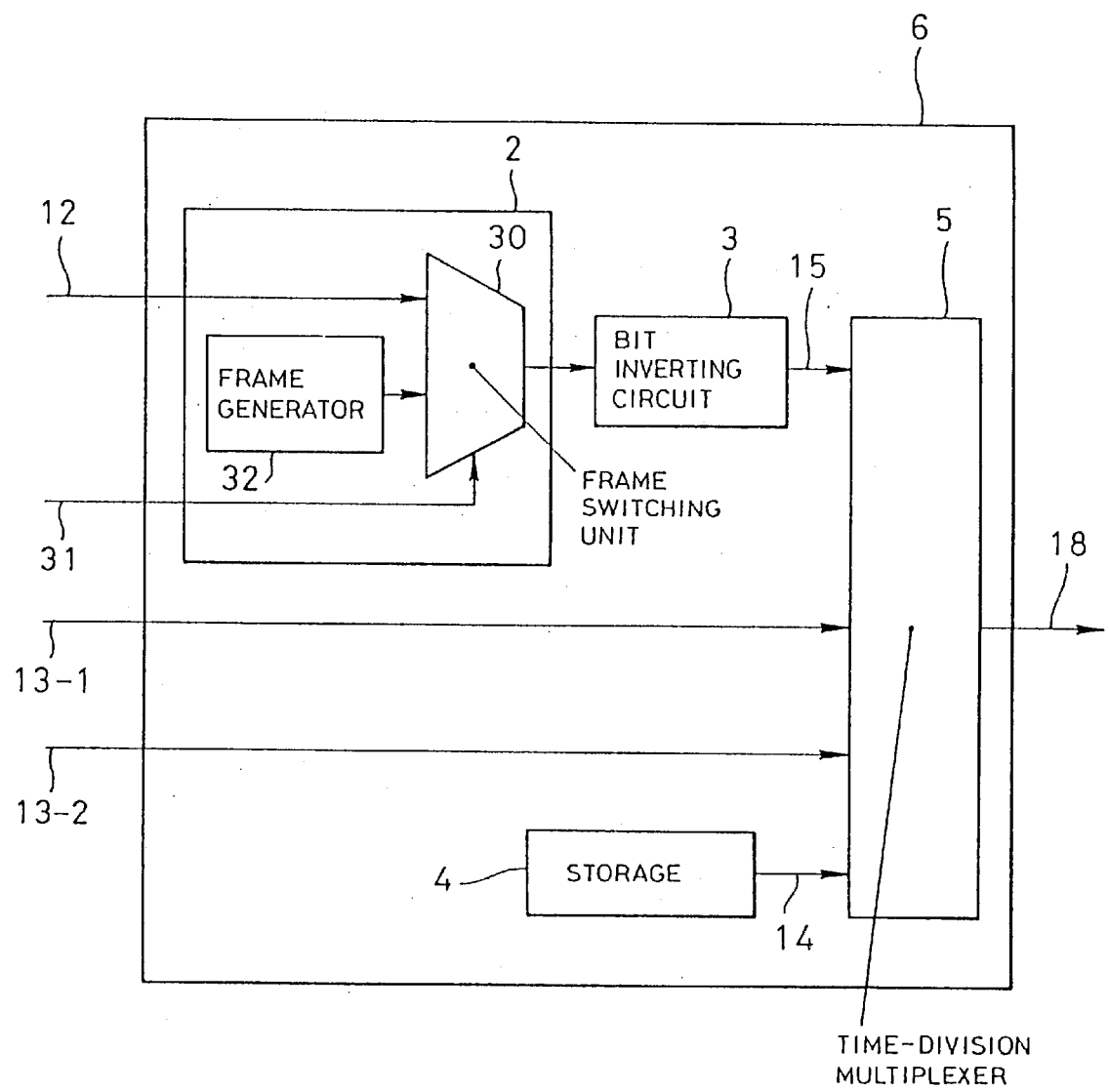
FIG. 11 is a block diagram showing another embodiment of the transmitter in the time-division multiplexing transmission system of the present invention.

FIG. 11 shows another constitution example of the transmitter 6 in the time-division multiplexing transmission system according to the present invention. As shown in the figure, in the transmitter 6 of this embodiment, an interior frame generator 32 is provided interiorly of a frame synchronization circuit 2. In correspondence with an interior/exterior frame switching control signal output from the generator 32, an interior/exterior frame switching unit 30 selects either the signal 12 with frame structure or the output signal of the interior frame generator 32. The remaining constitution is the same as the transmitter in FIG. 1.

Figure 12:
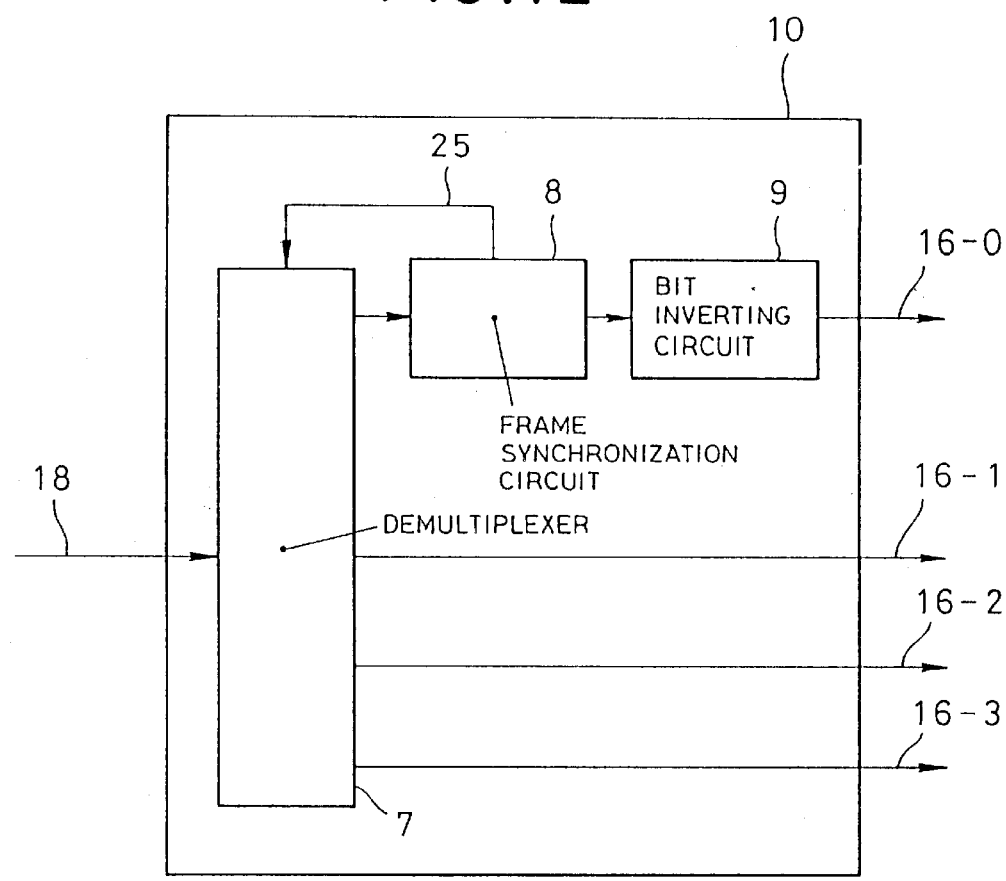
FIG. 12 is a block diagram showing still another embodiment of the receiver in the time-division multiplexing transmission system of the present invention.

FIG. 12 shows still another constitution example of the receiver 10 in the time-division multiplexing transmission system according to the present invention. As shown in the figure, in the receiver of this embodiment, a bit inverting circuit 9 is provided in the latter stage of a frame synchronization circuit 8. This bit inverting circuit 9 again inverts the synchronization pattern bit inverted by the inverting circuit 3 within the transmitter 6 and restores the synchronization pattern bit to the original bit pattern present before it is input to the transmitter. The restored pattern bit is output to the port 16-0. The remaining constitution is the same as the receiver in FIG. 1.

In this system, as described above, at least some of the synchronization patterns in a frame structure signal are inverted at a transmitter side, and each of a plurality of signals including a signal having the inverted synchronization patterns is multiplexed as one channel and transmitted in a time-division manner by the multiplexer. At the receiver side, the output signal from the multiplexer is demultiplexed into individual channels. Based on the channel having the inverted synchronization patterns among the individual channels, frame synchronization is performed, and based on the channel having the frame synchronization, the remaining channels are identified.

In other words, a simple channel identification method is first given to a channel of data fetched from a network. Then, the channel of having the identification method and other channels of data are multiplexed and transmitted onto a single transmission path. At the receiver side, the output signal of the transmitter is demultiplexed into individual channels, and the individual channels are identified by a simple channel identification method. If done in this manner, the system will be structurally simple and there will be no possibility that the system size will be increased.

In addition, the transmitter side unit and receiver side unit which are employed in this system can be realized with small size and low consumption power by simply circuitry construction. For example, the circuit size and consumption power can be reduced to ⅔ of a conventional system.

Furthermore, in this system, since signals of each channel are transparently transmitted, a terminal after the receiver may be the same as the terminal connected directly to a network, so there is no need to develop a special terminal for the transmitter newly.

Moreover, if the signal of at least one channel of among a plurality of channels has frame structure, the signals of other channels need not to have frame structure. Incidentally, the system according to the present invention can be utilized in transmission of various parallel signals. For example, each channel signal can be used as a television signal.

On the transmitter side and receiver side in the above-mentioned time-division multiplexing transmission system, the frame synchronization circuit and the bit inverting circuit are provided. Therefore, if these circuits are integrated on a single chip and mass-produced, the chip can be utilized in common on the transmitter side and receiver side.

Figure 13:
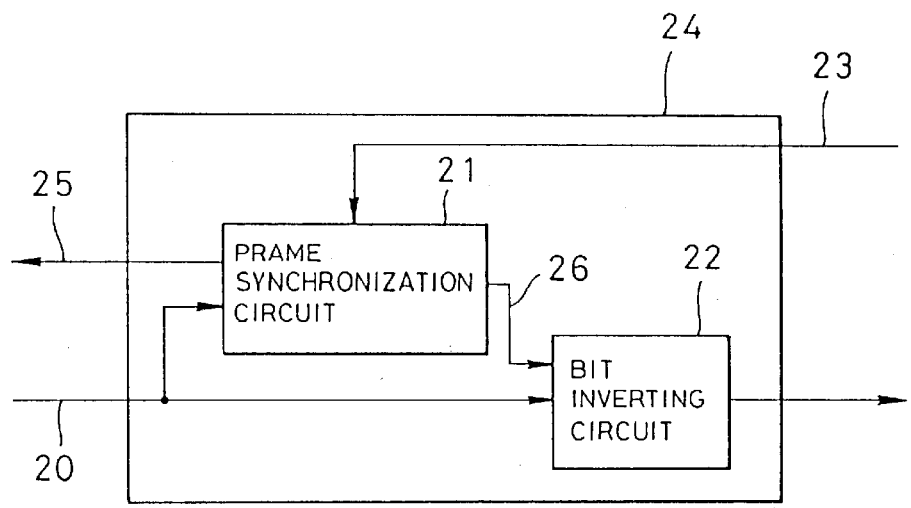
FIG. 13 is a block diagram showing an constitution example of the frame synchronization channel identification circuit of the present invention.

A description will be made of the constitution of such integration in reference to FIG. 13. FIG. 13 is a block diagram showing a frame synchronization channel identification circuit on which a frame synchronization circuit and a bit inverting circuit are integrated.

In the figure, the frame synchronization channel identification circuit is constituted by a frame synchronization circuit 21 for realizing a synchronization operation which is performed by either one or the other of two interior bit pattern detection circuits in correspondence with a synchronization pattern selection setting signal 23, and a bit inverting circuit 22 for inverting a predetermined synchronization pattern bit in an input signal 20 in correspondence with the synchronization pattern detection signal 26.

Figure 14:
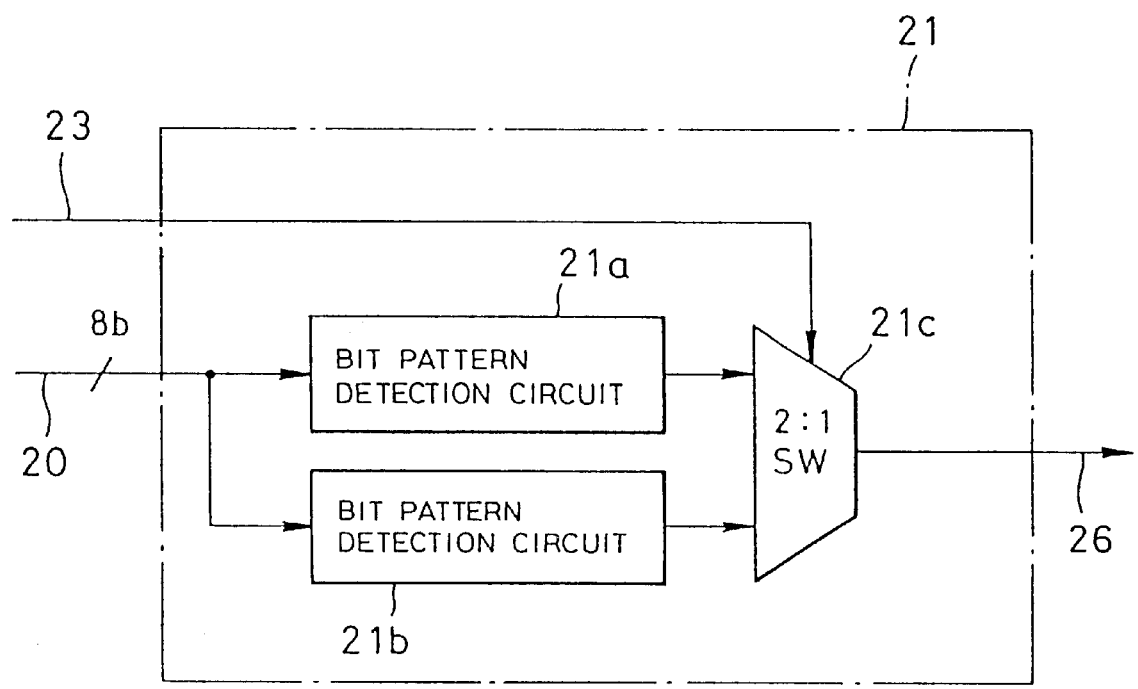
FIG. 14 is a block diagram showing the interior constitution of the frame synchronization circuit in FIG. 13.

The frame synchronization circuit 21, as shown in FIG. 14, is constituted by a first bit pattern detection circuit 21a which regards the input signal 20 as a signal having an inverted synchronization pattern and performs bit pattern detection for synchronization, a second bit pattern detection circuit 21b which regards the input signal 20 as a signal having no inverted synchronization pattern and performs bit pattern detection for synchronization, and a 2:1 selection switch 21c which selectively outputs the output signals of the first and second bit pattern detection circuits 21a and 21b in correspondence with the synchronization pattern selecting setting signal 23. The input signal 20 is assumed to be 8-bit parallel signals.

Returning to FIG. 13, in such constitution, the input signal 20 is divided into two and input to the frame synchronization circuit 21 and the bit inverting circuit 22. The frame synchronization circuit 21 selects an inverted synchronization pattern or a non-inverted synchronization pattern by the synchronization pattern selection setting signal 23 and performs a synchronization operation. In the case where the frame synchronization circuit 21 has the bit rotating function of the demultiplexer 7, the circuit 21 is caused to have a time-out counting function and generate a bit rotation control signal 25. When frame synchronization is established in the frame synchronization circuit 21, it generates a synchronization pattern detection signal 26 indicating the timing at which a synchronization pattern was detected.

The bit inverting circuit 22 receives the synchronization pattern detection signal 26 and inverts predetermined bits of the synchronization pattern in the input signal 20 in correspondence with the timing at which the signal 26 is input. Note that the above-mentioned interior frame generator 32 shown in FIG. 11 may be incorporated into the constitution of FIG. 13.

The aforementioned channel identification circuit according to the present invention can be used in the transmitter and the receiver in common, so there is no need to develop separate circuits for transmission and reception and development cost can be suppressed to about half a conventional development cost.

As described above, in the present invention, a simple channel identification method is given to frame data fetched from a network, and then the channel and other channels are multiplexed and transmitted. At the receiver side, each channel of the transmitter is demultiplexed into individual channels, and the individual channels are identified by a simple channel identification method. Therefore, there is an advantage that a time-division multiplexing transmission system which is small in size and low in consumption power can be realized with simple circuit constitution.

While the invention has been described with reference to preferred embodiments thereof, the invention is not to be limited to the details given herein, but may be modified within the scope of the appended claims.

What is claimed is:

1. A time-division multiplexing transmission system for multiplexing and transmitting a plurality of channels of signals which include at least one frame structure signal having frame structure in a time-division manner, the time-division multiplexing transmission system comprising:
   a transmitter having inversion means for inverting at least some of synchronization patterns in said frame structure signal, and time-division multiplexing means for multiplexing and transmitting a plurality of channels of signals which include a signal having the inverted synchronization patterns in a time-division manner; and
   a receiver having demultiplexing means for demultiplexing the time-division multiplexed channels into individual channels, frame synchronization means for performing frame synchronization on the basis of the channel having the inverted synchronization patterns among the demultiplexed channels, and channel identification means for using the frame synchronized channel as a reference and recognizing the remaining channels.

2. The time-division multiplexing transmission system as set forth in claim 1, wherein said receiver further includes means for returning the inverted synchronization patterns to the original synchronization patterns and then outputting said plurality of channels.

3. The time-division multiplexing transmission system as set forth in claim 1, wherein said frame structure signal is produced in the interior of said transmitter.

4. The time-division multiplexing transmission system as set forth in claim 1, wherein said frame structure signal is an external signal that is input to said transmitter.

5. The time-division multiplexing transmission system as set forth in claim 1, wherein said frame synchronization means performs frame synchronization on the basis of a plurality of kinds of synchronization patterns differing from one another, uses the frame synchronized channel as a reference, and identifies the remaining channels.

6. The time-division multiplexing transmission system as set forth in claim 1, wherein said frame is a frame by a synchronization digital hierarchy signal and wherein said synchronization patterns are A1 bytes and A2 bytes in said specific frame.

7. The time-division multiplexing transmission system as set forth in claim 1, wherein said frame is a frame by a basic trunk transmission signal and wherein said synchronization patterns are A1 bytes and A2 bytes in said specific frame.

8. A transmitter which is employed in a time-division multiplexing transmission system for multiplexing and tansmitting a plurality of channels of signals which include at least one frame structure signal having frame structure in a time-division manner, the transmitter comprising:
   inversion means for inverting at least some of synchronization patterns in said frame structure signal; and
   time-division multiplexing means for multiplexing and transmitting a plurality of channels of signals which include a signal having the inverted synchronization patterns in a time-division manner, said inverted synchronization patterns being used to identify a fame synchronization channel as a reference for channel identification means to recognize the remaining channels when said plurality of channels of signals are demultiplexed.

9. The transmitter as set forth in claim 8, wherein said frame structure signal is produced in the interior of said transmitter.

10. The transmitter as set forth in claim 8, wherein said frame is a frame by a synchronization digital hierarchy signal and wherein said synchronization patterns are A1 bytes and A2 bytes in said specific frame.

11. The transmitter as set forth in claim 8, wherein said frame is a frame by a basic trunk transmission signal and wherein said synchronization patterns are A1 bytes and A2 bytes in said specific frame.

12. A receiver which is employed in a time-division multiplexing transmission system for multiplexing and transmitting a plurality of channels of signals which include at least one frame structure signal having frame structure in a time-division manner, the receiver comprising:
   demultiplexing means for demultiplexing the time-division multiplexed channels into individual channels;
   frame synchronization means for performing frame synchronization on the basis of the channel having an inverted synchronization patterns among the demultiplexed channels; and
   channel identification means for using the frame synchronized channel as a reference and recognizing the remaining channels.

13. The receiver as set forth in claim 12, wherein said frame synchronization means performs frame synchronization on the basis of a plurality of kinds of synchronization patterns differing from one another, uses the frame synchronized channel as a reference, and identifies the remaining channels.

14. The receiver as set forth in claim 12, further comprising means for returning the inverted synchronization patterns to the original synchronization patterns and then outputting said plurality of channels.

15. The receiver as set forth in claim 12, wherein said frame is a frame by a synchronization digital hierarchy signal and wherein said synchronization patterns are A1 bytes and A2 bytes in said specific frame.

16. The receiver as set forth in claim 12, wherein said frame is a frame by a basic trunk transmission signal and wherein said synchronization patterns are A1 bytes and A2 bytes in said specific frame.

\* \* \* \* \*